United States Patent
Pandher et al.

(10) Patent No.: US 12,115,602 B2
(45) Date of Patent: Oct. 15, 2024

(54) LEAD-FREE SOLDER COMPOSITIONS

(71) Applicant: ALPHA ASSEMBLY SOLUTIONS INC., Somerset, NJ (US)

(72) Inventors: Ranjit Pandher, Waterbury, CT (US); Niveditha Nagarajan, Waterbury, CT (US); Anil Kumar, Waterbury, CT (US); Morgana de Avila Ribas, Waterbury, CT (US); Gyan Dutt, Waterbury, CT (US); Siuli Sarkar, Waterbury, CT (US); Carl Bilgrien, Waterbury, CT (US)

(73) Assignee: Alpha Assembly Solutions Inc., Waterbury, CT (US)

( * ) Notice: Subject to any disclaimer, the term of this patent is extended or adjusted under 35 U.S.C. 154(b) by 420 days.

(21) Appl. No.: 17/309,818

(22) PCT Filed: Dec. 26, 2019

(86) PCT No.: PCT/EP2019/025490
§ 371 (c)(1),
(2) Date: Jun. 21, 2021

(87) PCT Pub. No.: WO2020/135932
PCT Pub. Date: Jul. 2, 2020

(65) Prior Publication Data
US 2022/0072664 A1 Mar. 10, 2022

Related U.S. Application Data

(60) Provisional application No. 62/788,169, filed on Jan. 4, 2019, provisional application No. 62/785,293, filed on Dec. 27, 2018.

(51) Int. Cl.
*B23K 35/00* (2006.01)
*B23K 35/26* (2006.01)
*C22C 13/00* (2006.01)

(52) U.S. Cl.
CPC ............ *B23K 35/262* (2013.01); *C22C 13/00* (2013.01)

(58) Field of Classification Search
CPC ...... B23K 35/262; B23K 35/26; C22C 13/00; C22C 13/02
See application file for complete search history.

(56) References Cited

U.S. PATENT DOCUMENTS 6,180,264 B1   1/2001  Takaoka et al.
6,231,691 B1   5/2001  Anderson et al.
(Continued)

FOREIGN PATENT DOCUMENTS

CN   101143410 A   3/2008
CN   101780607 A   7/2010
(Continued)

OTHER PUBLICATIONS

Zhang Qiyun et al., "Manual of Brazing and Soldering," China Machine Press, 1998, 5 pages.

*Primary Examiner* — Erin B Saad
(74) *Attorney, Agent, or Firm* — Stinson LLP

(57) ABSTRACT

A lead-free solder alloy comprising: from 1 to 9 wt. % copper, at least one of: from greater than 0 to 1 wt. % nickel, from greater than 0 to 10 wt. % germanium, from greater than 0 to 10 wt. % manganese, from greater than 0 to 10 wt. % aluminium, from greater than 0 to 10 wt. % silicon, from greater than 0 to 9 wt. % bismuth, from greater than 0 to 5 wt. % indium, from greater than 0 to 1 wt. % titanium, from greater than 0 to 2 wt. % lanthanum, from greater than 0 to 2 wt. % neodymium, optionally one or more of: up to 1 wt. % for: chromium, gallium, cobalt, iron, phosphorous, gold, tellurium, selenium, calcium, vanadium, molybdenum, platinum, magnesium; up to 5 wt. % silver, up to 1 wt. % zinc, up to 2 wt. % rare earth metals, excluding lanthanum (Continued)

and neodymium, and the balance tin together with any unavoidable impurities.

9 Claims, 7 Drawing Sheets

(56) References Cited

U.S. PATENT DOCUMENTS

| | | |
|---|---|---|
| 6,296,722 B1 | 10/2001 | Nishimura |
| 7,172,726 B2 | 2/2007 | Ohnishi |
| 8,999,519 B2 | 4/2015 | Nishimura |
| 9,024,442 B2 | 5/2015 | Terashima et al. |
| 9,642,275 B2 | 5/2017 | Ohashi et al. |
| 2002/0155024 A1 | 10/2002 | Hwang |
| 2004/0115088 A1 | 6/2004 | Ohnishi |
| 2004/0126270 A1 | 7/2004 | Izumida et al. |
| 2007/0071634 A1* | 3/2007 | Huang ............... B23K 35/262 420/560 |
| 2010/0203353 A1 | 8/2010 | Anderson et al. |
| 2010/0297470 A1 | 11/2010 | Munekata et al. |
| 2012/0223430 A1 | 9/2012 | Terashima et al. |
| 2014/0054766 A1 | 2/2014 | Hashino et al. |
| 2015/0224604 A1 | 8/2015 | Choudhury et al. |
| 2017/0197281 A1 | 7/2017 | Choudhury et al. |
| 2018/0117715 A1 | 5/2018 | Momokawa |
| 2020/0140975 A1 | 5/2020 | Nishimura et al. |

FOREIGN PATENT DOCUMENTS

| | | |
|---|---|---|
| CN | 102039496 A1 | 5/2011 |
| CN | 103243234 A | 8/2013 |
| CN | 105195915 A | 12/2015 |
| CN | 107999993 A | 5/2018 |
| EP | 0985486 A1 | 3/2000 |
| EP | 2671667 A1 | 12/2013 |
| EP | 2747933 B1 | 5/2018 |
| JP | H09-155586 A | 6/1997 |
| JP | H11-77367 A | 3/1999 |
| JP | H11216591 A | 8/1999 |
| JP | 2000-190090 A | 7/2000 |
| JP | 2001-129682 A | 5/2001 |
| JP | 2002-120085 A | 4/2002 |
| JP | 2004-154864 A | 6/2004 |
| JP | 2005-125360 A | 5/2005 |
| JP | 2005-254298 A | 9/2005 |
| JP | 2009-502513 A | 1/2009 |
| JP | 2009-071315 A | 4/2009 |
| JP | 2010-089119 A | 4/2010 |
| JP | 2013-49073 A | 3/2013 |
| JP | 2014-36966 A | 2/2014 |
| JP | 5777979 B2 | 9/2015 |
| JP | 6369620 B1 | 8/2018 |
| KR | 100833113 B1 | 6/2008 |
| PL | 215758 B1 | 1/2014 |
| WO | 2009/022758 A1 | 2/2009 |
| WO | 2014/084242 A1 | 6/2014 |
| WO | 2018/181690 A1 | 2/2020 |

* cited by examiner

LEAD-FREE SOLDER COMPOSITIONS

The present invention relates generally to the field of metallurgy, and more particularly to a solder alloy. The solder alloy is particularly, though not exclusively, suitable for use in electronic soldering applications such as wave soldering, surface mounting technology, hot air leveling and ball grid arrays, land grid arrays, bottom terminated packages, LEDs and chip scale packages.

A typical packaging/assembly process of an LED or any other semiconductor device involves several steps in a series. At each of these steps, some kind of electrical/thermal interconnect material is used. The most common materials used in interconnects are conductive adhesives, sintered materials, soldering alloys, epoxies and polymers. Among them, conductive adhesives, sintering materials, epoxies and polymers go through an irreversible process phase transition during the contact formation process. However, solders go through a quasi-physical and mostly reversible phase transition during processing. Solders are the most common materials used in electronics assembly. A fixed and reproducible melting point of a solder is an advantage as far as formation of the interconnects is concerned. However, the same property of solders becomes a liability if the assembly process involves multiple steps using the same solder. Solder used in the first assembly process will go through repetitive melting and freezing cycles during secondary, ternary and so on process steps. Quality of the interconnect going through multiple melting/freezing cycles will degrade resulting in reduced life of the final product or the product with compromised reliability. Therefore, there is a need for soldering materials with different melting/freezing temperatures.

Before the electronics industry transitioned to Pb-free solders, different compositions of SnPb solders were being used to create a soldering temperatures hierarchy. For example, 10Sn90Pb or 05Sn95Pb or some of their variants with some Ag addition were used as die attach materials (also called level I interconnect in LED packaging and assembly terminology) because of their high melting temperatures (299° C. for 10Sn90Pb and 310° C. for 05Sn95Pb). 63Sn37Pb or some of its variants with melting temperature around 183° C. were used for circuit board assembly (also called Level II—V in the LED Industry). After restriction of Pb in solders, the most commonly used Pb-free solders were SnAg or SnAgCu (SAC) solders with melting temperature in the range 217-228° C. The only viable option for high-temperature Pb-free solder to replace high-Pb solders was 80Au20Sn. With 80% gold, Au20Sn is one of the most expensive solders. In addition, AuSn is a high modulus, relatively brittle material that results in interconnects with high stress. Similar material sets are being used in other semiconductor packaging and electronic assembly as well. Some of the properties, such as high thermal conductivity and high reliability, are even more important for packaging and assembly of high power electronics components, such as power diode, MOSFET and IGBT etc.

One of the lead-free alloy combinations currently being used in the electronics industry for the multilevel interconnections is the eutectic Sn—Cu alloy (Sn-0.7Cu) and Sn—Ag—Cu alloy (SAC305) system. However, a few drawbacks are inherently associated with the above alloy combination. The typical second reflow temperature is approximately 240 to 250° C., which is above the melting peak of Sn-0.7Cu system, i.e., 232° C. Since the Sn-0.7Cu solder joint is in a liquidus state during the second reflow it can lead to reliability issues with the reliability of the first level interconnect. Also, in this case die tilt or movement can occur also during secondary reflow or during rework processing of solder joints. Hence, there is a need for an alloy which can potentially overcome all the drawbacks mentioned above and partially or completely mitigate the reliability risks.

The present invention aims to solve at least some of the problems associated with the prior art or to provide a commercially acceptable alternative.

Accordingly, in a first aspect, the present invention provides a lead-free solder alloy comprising:
 from 1 to 9 wt. % copper,
 at least one of:
  from greater than 0 to 1 wt. % nickel,
  from greater than 0 to 10 wt. % germanium,
  from greater than 0 to 1 wt. % manganese,
  from greater than 0 to 10 wt. % aluminium,
  from greater than 0 to 10 wt. % silicon,
  from greater than 0 to 9 wt. % bismuth,
  from greater than 0 to 5 wt. % indium,
  from greater than 0 to 1 wt. % titanium,
  from greater than 0 to 2 wt. % lanthanum,
  from greater than 0 to 2 wt. % neodymium,
 optionally one or more of:
  up to 1 wt. % chromium,
  up to 1 wt. % gallium,
  up to 1 wt. % cobalt,
  up to 1 wt. % iron,
  up to 1 wt. % phosphorous,
  up to 1 wt. % gold,
  up to 1 wt. % tellurium,
  up to 1 wt. % selenium,
  up to 1 wt. % calcium,
  up to 1 wt. % vanadium,
  up to 1 wt. % molybdenum,
  up to 1 wt. % platinum,
  up to 1 wt. % magnesium,
  up to 5 wt. % silver,
  up to 1 wt. % zinc,
  up to 2 wt. % rare earth metals, excluding lanthanum and neodymium, and
 the balance tin together with any unavoidable impurities.

The present invention will now be further described. In the following passages different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

The term "solder alloy" used herein encompasses a fusible metal alloy with a melting point in the range of from 90 to 400° C. The alloys are lead-free meaning that no lead is added intentionally. Thus, the lead contents are zero or at no more than accidental impurity levels. The alloys are also typically antimony-free meaning that no antimony is added intentionally. Thus, the antimony contents are typically zero or at no more than accidental impurity levels.

The solder alloy may have a melting peak at or above 232° C., may be capable of forming a robust first level interconnect (die attach), and may reduce the risk of die tilt or movement during secondary reflow.

The solder alloy may be suitably used in a Pb-free soldering hierarchy in multilevel, multi-step electronics assembly. The alloy may be suitable for reflowing as a first reflow alloy or I level interconnect alloy, and may be a better alternative to Sn—Cu, SAC or SnAg eutectic alloys. In a die attach process, the solder alloy may provide stability to a semiconductor die-attach layer due to a decrease in fluidity at the secondary reflow processing temperature.

Without being bound by theory, it is considered that the presence of the optimum volume fraction of different types of intermetallic compounds, and other alloying additions, enhances the viscosity of the solder melt during level 11 reflow processing of a printed circuit board (PCB), without compromising the solderability during the level I die attach process. As a result, die tilt may be reduced.

Advantageously, the solder alloy may melt in the temperature range of 225° C. to 260° C., thereby making it suitable for reflow in a typical electronic assembly process.

The solder alloy may exhibit similar or improved thermomechanical reliability in comparison to conventional lead-free solder alloys such as, for example, SnCu, SAC and SnAg. The solder alloy may exhibit similar or improved mechanical properties in comparison to conventional lead-free solder alloys such as, for example, SnCu, SAC and SnAg.

The solder alloy may exhibit favourable wetting characteristics, for example wetting characteristics substantially similar to or better than those of conventional solder alloys such as, for example, SAC solder alloys and Sn0.7Cu solder alloys.

The solder comprises from 1 to 9 wt. % copper. Preferably, the solder alloy comprises from 1.2 to 7 wt. % copper, more preferably from 1.5 to 3.5 wt. % copper, even more preferably from 2 to 3 wt. % copper. In a particularly preferred embodiment, the solder alloy comprises about 2.5 wt. % copper. The solubility of copper in tin is limited. Sn-0.7% wt. Cu forms a eutectic phase. Any further addition beyond 0.7 wt. % of copper will increase the volume fraction of intermetallic compounds such as, for example, $Cu_3Sn$, and $Cu_6Sn_5$. These intermetallic compounds may serve to increase the viscosity of the alloy at a given temperature. These intermetallic compounds may also enhance the mechanical and thermal reliability of the alloy.

The solder alloy optionally (and preferably) comprises from greater than 0 to 1 wt. % nickel (e.g. from 0.001 to 1 wt. % nickel). Preferably, the solder alloy comprises from 0.001 to 0.2 wt. % nickel, more preferably from 0.005 to 0.02 wt. % nickel, even more preferably from 0.01 to less than 0.02 wt. % nickel. Nickel does not form a solid solution with tin. However, it forms intermetallic compounds that may result in improved mechanical properties of the alloy, and may increase the viscosity of the alloy at a given temperature. Nickel may serve to reduce copper dissolution.

The solder alloy optionally (and preferably) comprises from greater than 0 to 10 wt. % germanium (e.g. from 0.0005 to 10 wt. % germanium). Preferably, the alloy comprises from 0.0005 to 5 wt. % germanium, more preferably from 0.001 to 4.5 wt. % germanium, even more preferably from 0.001 to 0.005 wt. % germanium, still even more preferably from 0.002 to less than 0.005 wt. % germanium. In a preferred embodiment, the alloy comprises from 0.02 to 0.08 wt. % germanium. In another preferred embodiment, the alloy comprises from 3.5 to 4.5 wt. % germanium. Germanium may function as a deoxidiser, and may also improve wettability. Germanium also has good bonding characteristics with a semiconductor die. In a preferred embodiment, the alloy comprises both nickel and germanium. Such an alloy may provide a favourable combination of high viscosity, low copper dissolution and good wettability.

The solder alloy optionally (and preferably) comprises from greater than 0 to 1 wt. % manganese (e.g. from 0.001 to 1 wt. % manganese). Preferably, the alloy comprises from 0.005 to 0.5 wt. % manganese, more preferably from 0.01 to 0.3 wt. % manganese, even more preferably from 0.05 to 0.1 wt. % manganese. Manganese has limited solubility in tin and copper. Manganese, in the presence of only tin, forms intermetallic compounds such as, for example, $Mn_3Sn$, $Mn_2Sn$ and $MnSn_2$. In the presence of both copper and tin, manganese can also form intermetallic compounds such as, for example, $MnCu_5Sn_2$, $MnCu_2Sn$ and $MnCu_4Sn$. These intermetallic compounds may increase the viscosity of the Sn—Cu alloy at a given temperature. These intermetallic compounds may also enhance the mechanical and thermal reliability of the alloy.

The solder alloy optionally (and preferably) comprises from greater than 0 to 10 wt. % aluminium (e.g. from 0.005 to 10 wt. aluminium). Preferably the solder alloy comprises from 0.01 to 5 wt. % aluminium, more preferably from 0.05 to 2 wt. % aluminium. In a preferred embodiment, the alloy comprises from 0.005 to 0.015 wt. % aluminium. In another preferred embodiment, the alloy comprises from 0.02 to 0.08 wt. % aluminium. In another preferred embodiment, the alloy comprises from 0.8 to 1.2 wt. % aluminium. In another preferred embodiment, the alloy comprises from 3.5 to 4.5 wt. % aluminium. Aluminium may function as a deoxidiser, and may also improve wettability. Aluminium also has good bonding characteristics with a semiconductor die. The alloy preferably contains both germanium and aluminium. Aluminium and germanium both have a very limited solubility in the tin, but aluminium and germanium have good mutual solubility and form a eutectic mixture at 28.4 atomic % (~51.6 wt. %) of germanium.

The solder alloy optionally (and preferably) comprises from greater than 0 to 10 wt. % silicon (e.g. from 0.005 to 10 wt. % silicon). Preferably the solder alloy comprises from 0.01 to 8 wt. % silicon, more preferably from 0.02 to 6 wt. % silicon. In a preferred embodiment, the alloy comprises from 0.02 to 0.08 wt. % silicon. In another preferred embodiment, the alloy comprises from 3.5 to 4.5 wt. % silicon. Silicon may function as a deoxidiser, and may also improve wettability.

The solder alloy optionally (and preferably) comprises from greater than 0 to 9 wt. % bismuth (e.g. from 0.005 to 9 wt. % bismuth). Preferably, the solder alloy comprises from 0.01 to 7 wt. % bismuth, more preferably from 0.05 to 6 wt. % bismuth. In a preferred embodiment, the solder alloy comprises from 0.07 to 0.13 wt. % bismuth. In another preferred embodiment, the solder alloy comprises from 2 to 5 wt. % bismuth, preferably from 3.5 to 4.5 wt. % bismuth. Bismuth has some solubility in tin, which may provide improve mechanical properties via solid solution strengthening. Bismuth may also act to improve creep resistance. Bismuth may also improve wetting and spread.

The solder alloy optionally (and preferably) comprises from greater than 0 to 5 wt. % indium. Preferably, the solder alloy comprises from 0.2 to 3 wt. % indium, more preferably from 1.5 to 2.5 wt. % indium, even more preferably from 1.8 to 2.2 wt. % indium. Indium has some solubility in tin, which may provide an opportunity for improved mechanical properties via solid solution strengthening. In addition, indium may serve to reduce the liquidus temperature of the solder alloy, thereby allowing the alloy to be reflowed at a lower temperature than the base alloy. However, greater amounts of indium may decrease the favourable properties of the solder alloy, such as its mechanical strength, solderability and long-term thermo-mechanical stability. In addition, greater amounts of indium may render the solder alloy unfavourably susceptible to oxidation.

The solder alloy optionally (and preferably) comprises from greater than 0 to 1 wt. % titanium (e.g. from 0.01 to 1 wt. % titanium). Preferably, the solder alloy comprises from 0.015 to 0.5 wt. % titanium, more preferably from 0.02 to 0.08 wt. % titanium. Titanium has limited solubility in tin and may form intermetallic compounds, which can further reduce the fluidity of the solder melt during reflow processing. Titanium may improve strength and interfacial reactions. Titanium may also improve drop shock performance by controlling copper diffusion at the substrate/solder interface.

The solder alloy optionally (and preferably) comprises from greater than 0 to 2 wt. % lanthanum (e.g. from 0.01 to 2 wt. % lanthanum). Preferably, the solder alloy comprises from 0.05 to 1 wt. % lanthanum, more preferably from 0.1 to 0.5 wt. % lanthanum. Lanthanum may act to improve spread and wettability.

The solder alloy optionally (and preferably) comprises from greater than 0 to 2 wt. % neodymium (e.g. from 0.01 to 2 wt. % neodymium). Preferably, the solder alloy comprises from 0.05 to 1 wt. % neodymium, more preferably from 0.1 to 0.5 wt. % neodymium. Neodymium may act to improve spread and wettability.

The solder alloy comprises at least one of nickel, germanium, manganese, aluminium, silicon, bismuth, indium, titanium, lanthanum, neodymium. Preferably, the solder alloy comprises at least two of these elements. In a preferred embodiment, the solder alloy comprises two of these elements. In another preferred embodiment, the solder alloy comprises three of these elements. In another preferred embodiment, the solder alloy comprises four of these elements. In another preferred embodiment, the solder alloy comprises nickel and germanium. In another preferred embodiment, the solder alloy comprises nickel, manganese and phosphorous. In another preferred embodiment, the solder alloy comprises aluminium, germanium, nickel and bismuth. In another preferred embodiment, the solder alloy comprises indium, titanium, lanthanum and nickel.

The solder alloy optionally comprises one or more of: up to 1 wt. % chromium (e.g. from 0.01 to 1 wt. % chromium), up to 1 wt. % gallium (e.g. from 0.01 to 1 wt. % gallium), up to 1 wt. % cobalt (e.g. from 0.01 to 1 wt. % cobalt), up to 1 wt. % iron (e.g. from 0.01 to 1 wt. % iron), up to 1 wt. % phosphorous (e.g. from 0.01 to 1 wt. % phosphorous), up to 1 wt. % gold (e.g. from 0.01 to 1 wt. % gold), up to 1 wt. % tellurium (e.g. from 0.01 to 1 wt. % tellurium), up to 1 wt. % selenium (e.g. from 0.01 to 1 wt. % selenium), up to 1 wt. % calcium (e.g. from 0.01 to 1 wt. % calcium), up to 1 wt. % vanadium (e.g. from 0.01 to 1 wt. % vanadium), up to 1 wt. % molybdenum (e.g. from 0.01 to 1 wt. % molybdenum), up to 1 wt. % platinum (e.g. from 0.01 to 1 wt. % platinum), up to 1 wt. % magnesium (e.g. from 0.01 to 1 wt. % magnesium), up to 5 wt. % silver (e.g. from 0.01 to 5 wt. % silver), up to 1 wt. % zinc (e.g. from 0.01 to 1 wt. % zinc), and up to 2 wt. % rare earth metals, excluding lanthanum and neodymium (e.g. from 0.01 to 2 wt. % rare earth metals). Gallium and zinc have some solubility in tin, which can provide an opportunity for solid solution strengthening. However, higher levels of zinc may decrease the solderability of the solder alloy. Cobalt may be used for reducing copper dissolution. Calcium, magnesium, phosphorous, and vanadium are possible deoxidizers that can also be used for improving wettability. Gold, chromium, iron, molybdenum, platinum, selenium and tellurium and can be used for improved strength and interfacial reactions. Silver and rare earths can improve spread and wettability. The term rare earth element as used herein refers to one or more elements selected from Sc, Y, La, Ce, Pr, Nd, Pm, Sm, Eu, Gd, Tb, Dy, Ho, Er, Tm, Yb and Lu. Silver may serve to provide more favourable mechanical properties and may increase the viscosity of the solder alloy at a given temperature via the formation of intermetallic compounds.

The alloy will typically comprise at least 80 wt. % tin, more typically at least 85 wt. % tin, still more typically at least 90 wt. % tin, still more typically at least 95 wt. % tin. The alloy will typically comprise up to 98 wt. % tin, more typically up to 97 wt. % tin.

It will be appreciated that the alloys described herein may contain unavoidable impurities, although, in total, these are unlikely to exceed 1 wt. % of the composition. Preferably, the solder alloys contain unavoidable impurities in an amount of not more than 0.5 wt. % of the composition, more preferably not more than 0.3 wt. % of the composition, still more preferably not more than 0.1 wt. % of the composition, still more preferably not more than 0.05 wt. % of the composition, and most preferably not more than 0.02 wt. % of the composition.

The solder alloys described herein may consist of the recite elements. Alternatively, the solder alloys described herein may consist essentially of the recited elements. It will therefore be appreciated that in addition to those elements that are mandatory (i.e. tin, copper and at least one of nickel, germanium, manganese, aluminium, silicon, bismuth, indium, titanium, lanthanum and neodymium) other non-specified elements may be present in the composition provided that the essential characteristics of the composition are not materially affected by their presence.

In a particularly preferred embodiment, the solder alloy consists of from 2 to 3 wt. % copper, from 0.005 to 0.02 wt. % nickel, from 0.001 to 0.005 wt. % germanium, and the balance tin together with any unavoidable impurities. In comparison to conventional SAC305 and Sn0.7Cu solder alloys, such a solder alloy exhibits minimal die tilt between first and fourth reflows, a reduction in void percentage between first and fourth reflows, increased die shear strength and improved thermo-cycling behaviour.

In a particularly preferred embodiment, the solder alloy consists of from 1 to 7 wt. % copper, from 0.1 to 1 wt. % of nickel, from 0.05 to 0.5 wt. % of manganese, and from 0.05 to 0.1 wt. % of phosphorus, and the balance tin, together with unavoidable impurities. Such a solder alloy favourably has a melting peak at 232° C. In comparison to conventional SAC305 and Sn0.7Cu solder alloys, such a solder alloy exhibits minimal die tilt between first and fourth reflows, a reduction in void percentage between first and fourth reflows, increased die shear strength and improved thermos-cycling behaviour.

In a particularly preferred embodiment, the solder alloy consists of from 3 to 7 wt. % copper, from 0.1 to 1 wt. % aluminium, from 0.1 to 1 wt. % germanium, from 0.05 to 0.1 wt. % nickel, from 2 to 5 wt. % bismuth, and the balance tin, together with unavoidable impurities. Such a solder alloy favourably has a melting peak at 232° C. In comparison to conventional SAC305 and Sn0.7Cu solder alloys, such a solder alloy exhibits minimal die tilt between first and fourth reflows, a reduction in void percentage between first and fourth reflows, increased die shear strength and improved thermos-cycling behaviour.

In a particularly preferred embodiment, the solder alloy consists of from 4 to 7 wt. % copper, from 0.1 to 2 wt. % indium, from 0.1 to 0.5 wt. % titanium, and from 0.1 to 0.5 wt. % lanthanum, from 0.1 to 0.2 wt. % of nickel, and the balance tin, together with unavoidable impurities. Such a solder alloy favourably has a melting peak at 232° C. In comparison to conventional SAC305 and Sn0.7Cu solder alloys, such a solder alloy exhibits minimal die tilt between first and fourth reflows, a reduction in void percentage between first and fourth reflows, increased die shear strength and improved thermos-cycling behaviour.

The solder alloy may be in the form of a bar, a rod, a solid wire with or without flux, a foil or strip, a film, a preform, or a powder or paste (powder plus flux blend), or solder spheres for use in ball grid array joints, or a pre-formed solder piece or a reflowed or solidified solder joint, or pre-applied on any solderable material such as a copper ribbon for photovoltaic applications.

In a further aspect, the present invention provides a soldered joint comprising the solder alloy described herein.

In a further aspect, the present invention provides a solder paste comprising:
   the solder alloy described herein, and
   a solder flux.

In a further aspect, the present invention provides a method of forming a solder joint comprising:
   (i) providing two or more work pieces to be joined;
   (ii) providing a solder alloy as described herein; and
   (iii) heating the solder alloy in the vicinity of the work pieces to be joined.

The work pieces may be components of a printed circuit board, such as a substrate and a die.

In a further aspect, the present invention provides use of a solder alloy as described herein in a soldering method. Preferably, the soldering method is selected from Surface Mount Technology (SMT) soldering, die attach soldering, thermal interface soldering, hand soldering, laser and RF induction soldering, and rework soldering.

In a further aspect, the present invention provides a solder alloy or solder joint comprising:
   (a) from 1 to 9 wt. % of copper
   (b) one or more of
      0 to 1 wt. % nickel
      0 to 1 wt. % of Manganese
   (c) Optionally one or more of the following elements
      up to 1 wt. % of titanium
      up to 2 wt. % of one or more rare earths, cerium, lanthanum, neodymium
      up to 1 wt. % of chromium
      up to 10 wt. % of germanium
      up to 1 wt. % gallium
      up to 1 wt. % cobalt
      up to 1 wt. % of iron
      up to 10 wt. % of aluminium
      up to 1 wt. % of phosphor
      up to 1 wt. % of gold
      up to 1 wt. % of tellurium
      up to 1 wt. % of selenium
      up to 1 wt. % of calcium
      up to 1 wt. % of vanadium
      up to 1 wt. % of molybdenum
      up to 1 wt. % of platinum
      up to 1 wt. % of magnesium
      up to 10 wt. % of silicon
      up to 9 wt. % of bismuth
      up to 5 wt. % of silver
      up to 5 wt. % of indium
   (d) the balance tin, together with unavoidable impurities.

The advantages and preferred features of the first aspect apply equally to this aspect.

In a further aspect, the present invention provides a solder alloy or solder joint comprising:
   (a) 1 to 9 wt. % of copper
   (b) one or more of
      0 to 10 wt. % of aluminium
      0 to 10 wt. % of germanium
      0 to 10 wt. % of Silicon
      0 to 9 wt. % of bismuth
   (c) optionally one or more of the following elements
      up to 1 wt. % of nickel
      up to 1 wt. % of titanium
      up to 2 wt. % of rare earths, Ex. Cerium, lanthanum, neodymium
      up to 1 wt. % of chromium
      up to 1 wt. % of manganese
      up to 1 wt. % gallium
      up to 1 wt. % cobalt
      up to 1 wt. % of iron
      up to 1 wt. % of phosphor
      up to 1 wt. % of gold
      up to 1 wt. % of tellurium
      up to 1 wt. % of selenium
      up to 1 wt. % of calcium
      up to 1 wt. % of vanadium
      up to 1 wt. % of molybdenum
      up to 1 wt. % of platinum
      up to 1 wt. % of magnesium
      up to 5 wt. % of silver
      up to 5 wt. % of indium
   (d) the balance tin, together with unavoidable impurities.

The advantages and preferred features of the first aspect apply equally to this aspect.

In a further aspect, the present invention provides a solder alloy or solder joint comprising:
   (a) 1 to 9 wt. % or less copper
   (b) one or more of
      0 to 1 wt. % nickel
      0 to 5 wt. % of indium
      0 to 1 wt. % of titanium
      0 to 2 wt. % of lanthanum
      0 to 2 wt. % of neodymium
   (c) optionally one or more of the following elements
      up to 2 wt. % of rare earth, cerium
      up to 1 wt. % of chromium
      up to 1 wt. % of manganese
      up to 1 wt. % gallium
      up to 1 wt. % cobalt
      up to 1 wt. % of iron
      up to 1 wt. % of phosphor
      up to 1 wt. % of gold
      up to 1 wt. % of tellurium
      up to 1 wt. % of selenium
      up to 1 wt. % of calcium
      up to 1 wt. % of vanadium up to 1 wt. % of molybdenum
up to 1 wt. % of platinum
up to 1 wt. % of magnesium
up to 10 wt. % of silicon
up to 10 wt. % of germanium
up to 9 wt. % of bismuth
up to 5 wt. % of silver
up to 10 wt. % of aluminium
(d) the balance tin, together with unavoidable impurities.

The advantages and preferred features of the first aspect apply equally to this aspect.

The present invention will now be described further, by way of few non-limiting examples of these alloys and a summary of their performance, with reference to the following drawings in which.

Example 1

Figure 1:
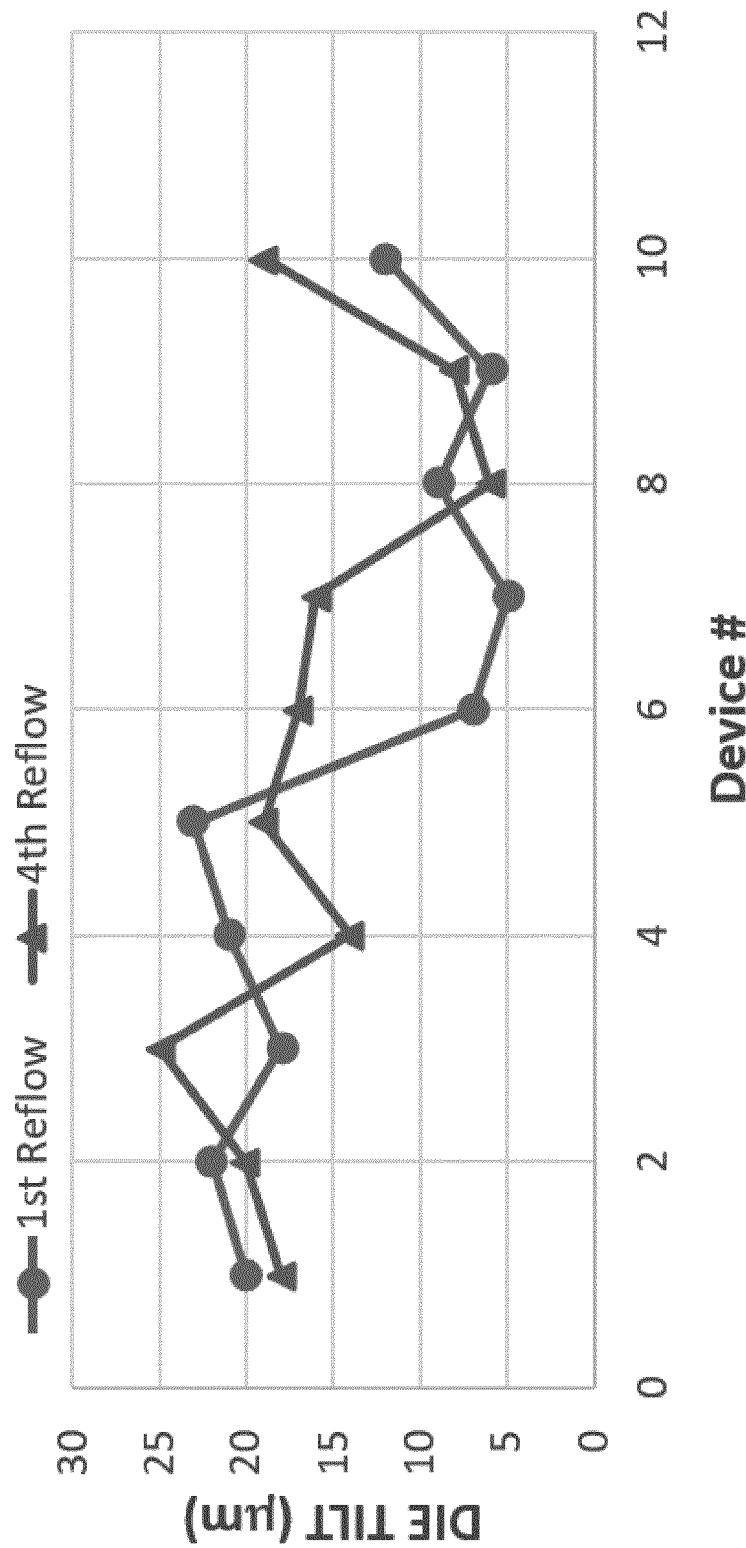
FIG. 1 shows a plot of die tilt (μm) vs device #/reflow for conventional solder SAC305.

Alloys were prepared having the following compositions:
Alloy ID—HC1:
  Cu: 1 to 7 wt. %,
  Ni: 0.1 to 1 wt. %,
  Mn: 0.05 to 0.5 wt. %,
  P: 0.05 to 0.1 wt. %,
  Balance: Sn, together with unavoidable impurities.
Such a solder alloy favourably has a melting peak at 232° C.

Alloy ID—HC2:
  Cu: 3 to 7 wt. %,
  Al: 0.1 to 1 wt. %,
  Ge: 0.1 to 1 wt. %,
  Ni: 0.05 to 0.1 wt. %,
  Bi: 2 to 5 wt. %,
  Balance: Sn, together with unavoidable impurities.
Such a solder alloy favorably has a melting peak at 232° C.

Alloy ID—HC3:
  Cu: 4 to 7 wt. %,
  In: 0.1 to 2 wt. %,
  Ti: 0.1 to 0.5 wt. %,
  La: 0.1 to 0.5 wt. %,
  Ni: 0.1 to 0.2 wt. %,
  Balance: Sn, together with unavoidable impurities.
Such a solder alloy favourably has a melting peak at 232° C.

Example 2

Alloys were prepared having the compositions set out in Table 1 below.

TABLE 1

Compositions of solder alloys.

| Alloy ID | Sn | Cu | Co | Ni | Ti | Al | Si | Ge | P | Mn | In | Bi | Ce |
|---|---|---|---|---|---|---|---|---|---|---|---|---|---|
| HC4 | Balance | 1 | 0.1 | 0.05 | | | | | 0.005 | | | | |
| HC5 | Balance | 3 | 0.1 | 0.05 | 0.05 | | | | 0.005 | | | | |
| HC6 | Balance | 5 | 0.1 | 0.05 | | | | | | | | 0.1 | |
| HC7 | Balance | 7 | 0.1 | 0.05 | | | | | | | | 0.1 | |
| HC8 | Balance | 5 | 0.1 | 0.1 | 0.05 | | | | | | | | |
| HC9 | Balance | 7 | 0.1 | 0.1 | 0.05 | 0.01 | | | | | | | |
| HC10 | Balance | 3 | 0.1 | 0.1 | 0.05 | | | | 0.005 | | 2 | | |
| HC11 | Balance | 5 | 0.1 | 0.1 | 0.05 | | | | 0.005 | | 2 | | |
| HC12 | Balance | 7 | 0.1 | 0.1 | 0.05 | | | | 0.005 | | 2 | | |
| HC13 | Balance | 3 | 0.1 | 0.1 | 0.05 | | | | | | 2 | | |
| HC14 | Balance | 5 | 0.1 | 0.1 | 0.05 | | | | | | 2 | | |
| HC15 | Balance | 7 | 0.1 | 0.1 | 0.05 | | | | | | 2 | | |
| HC16 | Balance | 3 | 0.1 | | 0.05 | | | | 0.005 | | | | 0.05 |
| HC17 | Balance | 5 | 0.1 | | 0.05 | | | | 0.005 | | | | 0.05 |
| HC18 | Balance | 7 | 0.1 | | 0.05 | | | | 0.005 | | | | 0.05 |
| HC19 | Balance | 3 | | 0.1 | 0.05 | 0.01 | | 0.005 | | | | | |
| HC20 | Balance | 3 | | 0.05 | 0.05 | 0.01 | | 0.005 | | | | | |
| HC21 | Balance | 5 | | 0.05 | 0.05 | 0.01 | | 0.005 | | | | | |
| HC22 | Balance | 7 | | 0.05 | 0.05 | 0.01 | | 0.005 | | | | | |
| HC23 | Balance | 4 | | 0.05 | | 0.01 | | 0.005 | | | | | |
| HC24 | Balance | 5 | | 0.05 | | 0.01 | | 0.005 | | | | | |
| HC25 | Balance | 7 | | 0.05 | | 0.01 | | 0.005 | | | | | |
| HC26 | Balance | 3 | | 0.05 | 0.05 | | 0.05 | | | | | 0.1 | |
| HC27 | Balance | 5 | | 0.05 | 0.05 | | 0.05 | | | | | 0.1 | |
| HC28 | Balance | 7 | | 0.05 | 0.05 | | 0.05 | | | | | 0.1 | |
| HC29 | Balance | 5 | | 0.1 | 0.05 | | 0.05 | | | | | | |
| HC30 | Balance | 7 | | 0.1 | 0.05 | | 0.05 | | | | | | |
| HC31 | Balance | 6 | | 0.1 | | 0.05 | | 0.005 | | | | | |
| HC32 | Balance | 3 | | 0.1 | 0.05 | | | | | | 0.01 | 0.1 | |
| HC33 | Balance | 4 | | 0.1 | 0.05 | | | | | | 0.01 | 0.1 | |
| HC34 | Balance | 7 | | 0.1 | 0.05 | | | | | | 0.01 | 0.1 | |
| HC35 | Balance | 3 | | 0.1 | 0.05 | | | | | | 0.01 | | |
| HC36 | Balance | 5 | | 0.1 | 0.05 | | | | | | 0.01 | | |

TABLE 1-continued

Compositions of solder alloys.

| Alloy ID | Sn | Cu | Co | Ni | Ti | Al | Si | Ge | P | Mn | In | Bi | Ce |
|---|---|---|---|---|---|---|---|---|---|---|---|---|---|
| HC37 | Balance | 7 |  | 0.1 | 0.05 |  |  |  |  | 0.01 |  |  |  |
| HC38 | Balance | 3 |  | 0.1 | 0.05 |  |  |  |  | 0.01 | 2 |  |  |
| HC39 | Balance | 5 |  | 0.1 | 0.05 |  |  |  |  | 0.01 | 2 |  |  |
| HC40 | Balance | 7 |  | 0.1 | 0.05 |  |  |  |  | 0.01 | 2 |  |  |
| HC41 | Balance | 3 |  | 0.1 |  |  |  | 0.005 |  |  | 2 | 0.1 |  |
| HC42 | Balance | 5 |  | 0.1 |  |  |  | 0.005 |  |  | 2 | 0.1 |  |
| HC43 | Balance | 7 |  | 0.1 |  |  |  | 0.005 |  |  | 2 | 0.1 |  |
| HC44 | Balance | 3 |  |  | 0.05 | 0.01 | 0.05 |  |  |  |  |  |  |
| HC45 | Balance | 5 |  |  | 0.05 | 0.01 | 0.05 |  |  |  |  |  |  |
| HC46 | Balance | 7 |  |  | 0.05 | 0.01 | 0.05 |  |  |  |  |  |  |
| HC47 | Balance | 3 |  | 0.05 | 0.05 | 1 | 5 |  |  |  |  | 0.1 |  |
| HC48 | Balance | 5 |  | 0.05 | 0.05 | 1 | 5 |  |  |  |  | 0.1 |  |
| HC49 | Balance | 7 |  | 0.05 | 0.05 | 1 | 5 |  |  |  |  | 0.1 |  |
| HC50 | Balance | 3 |  | 0.05 |  | 4 |  | 4 |  |  |  |  |  |
| HC51 | Balance | 5 |  | 0.05 | 0.05 | 4 |  | 4 |  |  |  |  |  |
| HC52 | Balance | 7 |  | 0.05 | 0.05 | 4 |  | 4 |  |  |  |  |  |
| HC53 | Balance | 3 | 0.1 |  |  |  |  | 0.005 |  |  |  | 4 |  |
| HC54 | Balance | 5 | 0.1 |  |  |  |  | 0.005 |  |  |  | 4 |  |
| HC55 | Balance | 7 | 0.1 |  |  |  |  | 0.005 |  |  |  | 4 |  |
| HC56 | Balance | 3 |  | 0.1 | 0.05 | 0.05 |  | 0.005 |  |  |  | 4 |  |
| HC57 | Balance | 5 |  | 0.1 | 0.05 | 0.05 |  | 0.005 |  |  |  | 4 |  |
| HC58 | Balance | 7 |  | 0.1 | 0.05 | 0.05 |  | 0.005 |  |  | 2 | 0.1 |  |
| HC59 | Balance | 5 |  | 0.1 | 0.05 | 0.05 | 0.05 | 0.005 |  |  | 2 | 0.1 |  |
| HC60 | Balance | 7 |  | 0.1 | 0.05 | 0.05 | 0.05 | 0.005 |  |  | 2 | 0.1 |  |

Between 225 and 280° C., the alloys in Table 1 have a liquid fraction equal or higher than 50%. The liquid fraction is theoretically calculated as liquid fraction (%)=100−solid fraction (%)

Example 3

Figure 2:
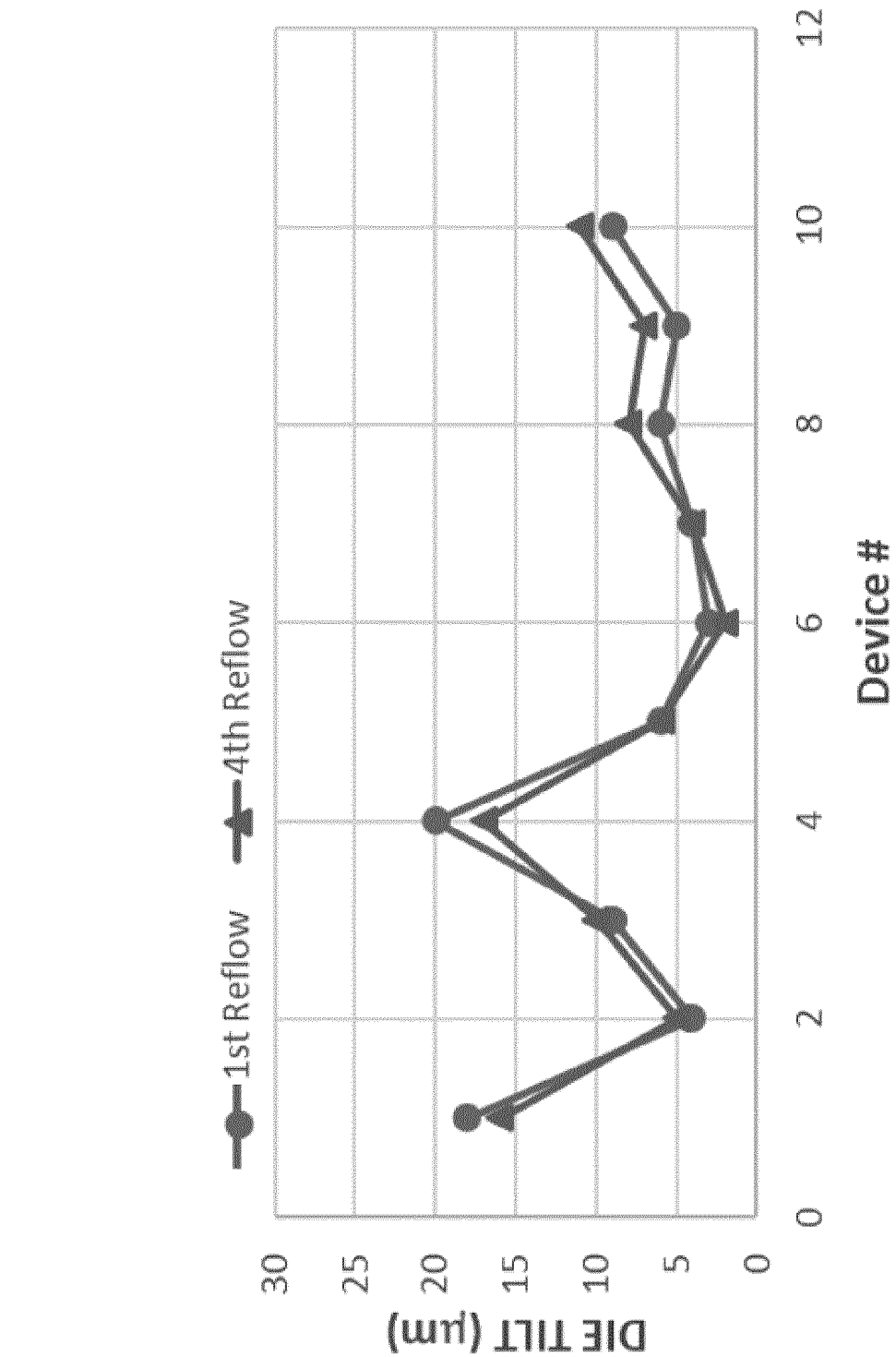
FIG. 2 shows a plot of die tilt (μm) vs device #/reflow for the solder alloy of Example 3 SnCuNiGe.
Figure 3:
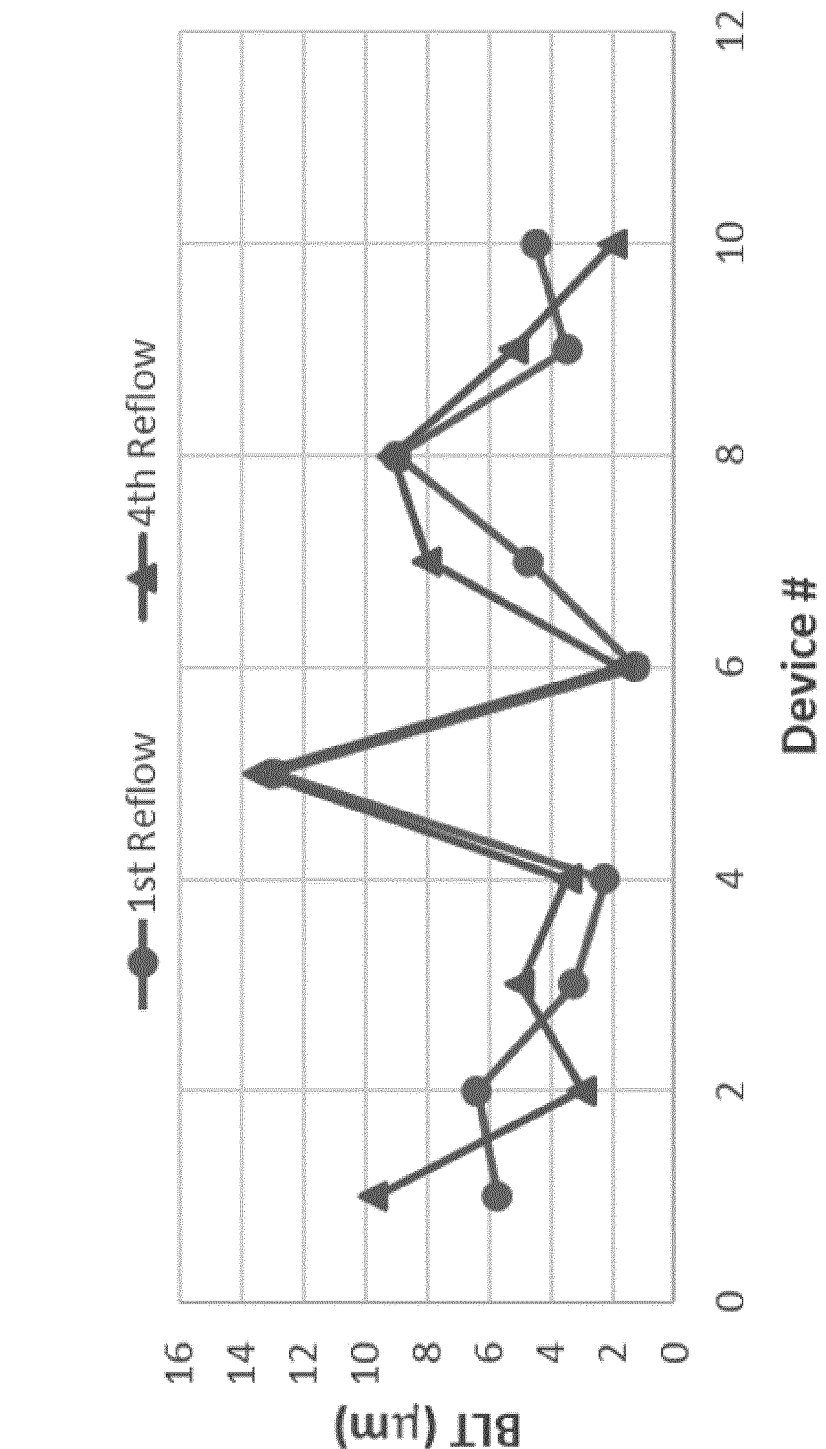
FIG. 3 shows a plot of BLT (μm) vs device #/reflow for conventional solder SAC305.
Figure 4:
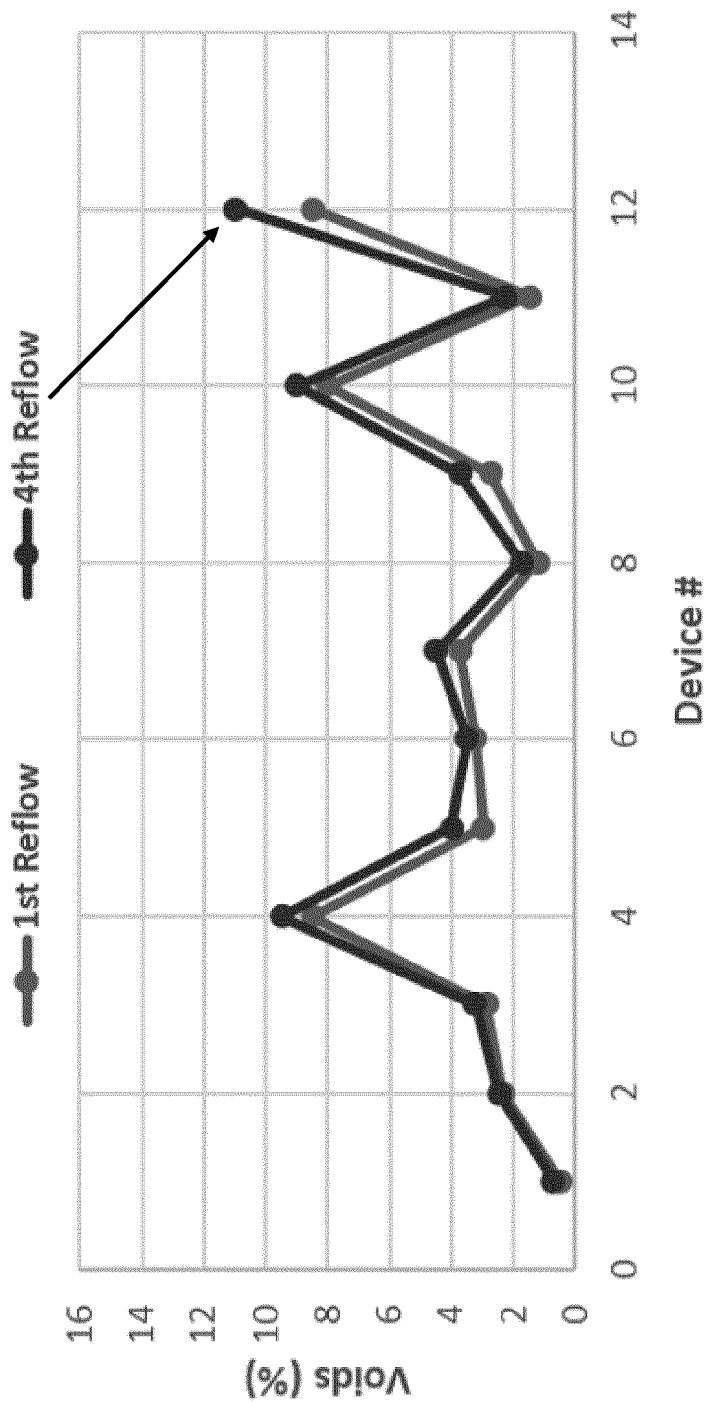
FIG. 4 shows a plot of BLT (μm) vs device #/reflow for the solder alloy of Example 3 SnCuNiGe.
Figure 5:
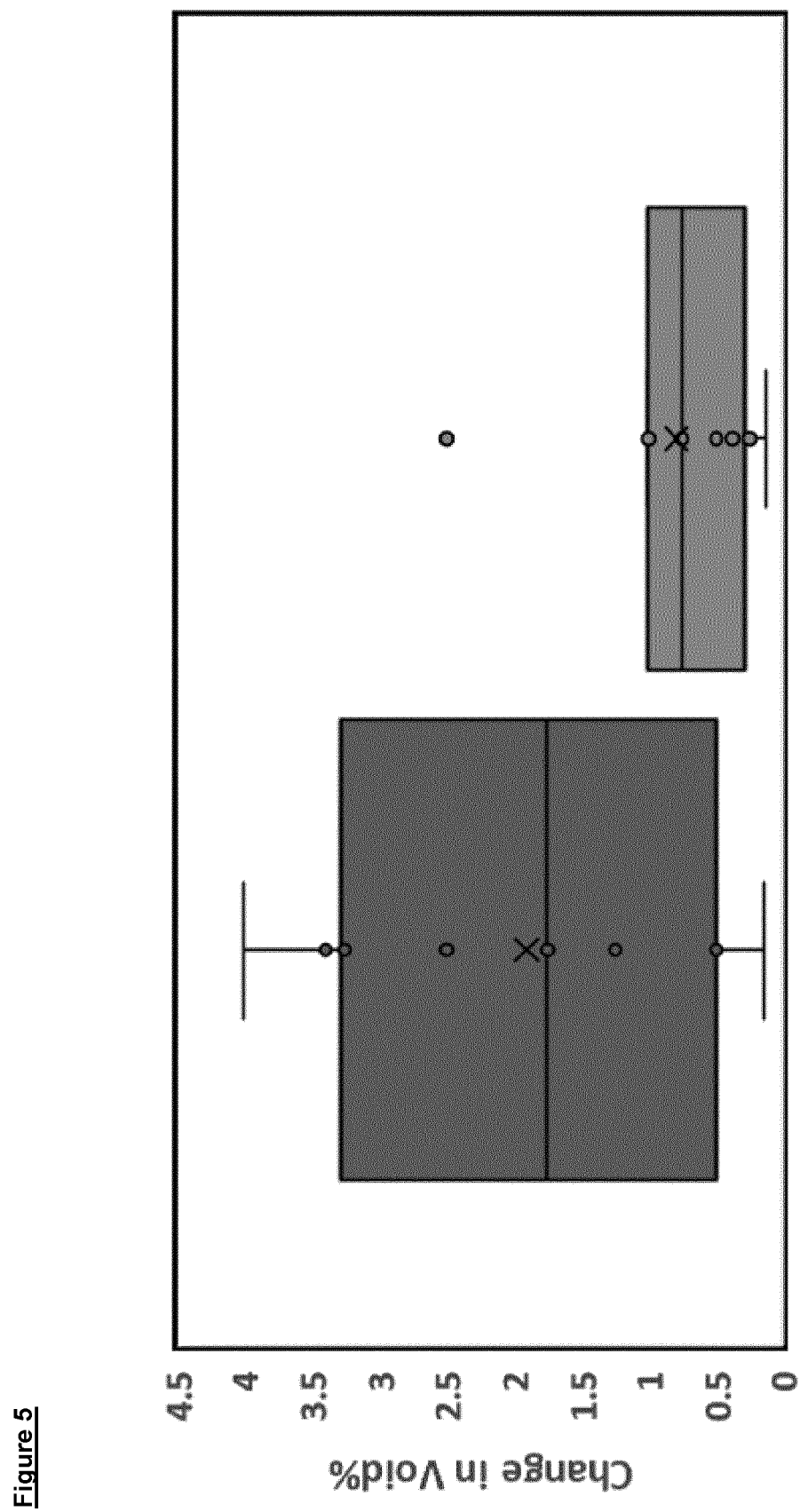
FIG. 5 shows a plot in the change in voids (%) between $1^{st}$ and $4^{th}$ reflows for conventional solder SAC305 (left) and the solder alloy of Example 3 SnCuNiGe (right)
Figure 6:
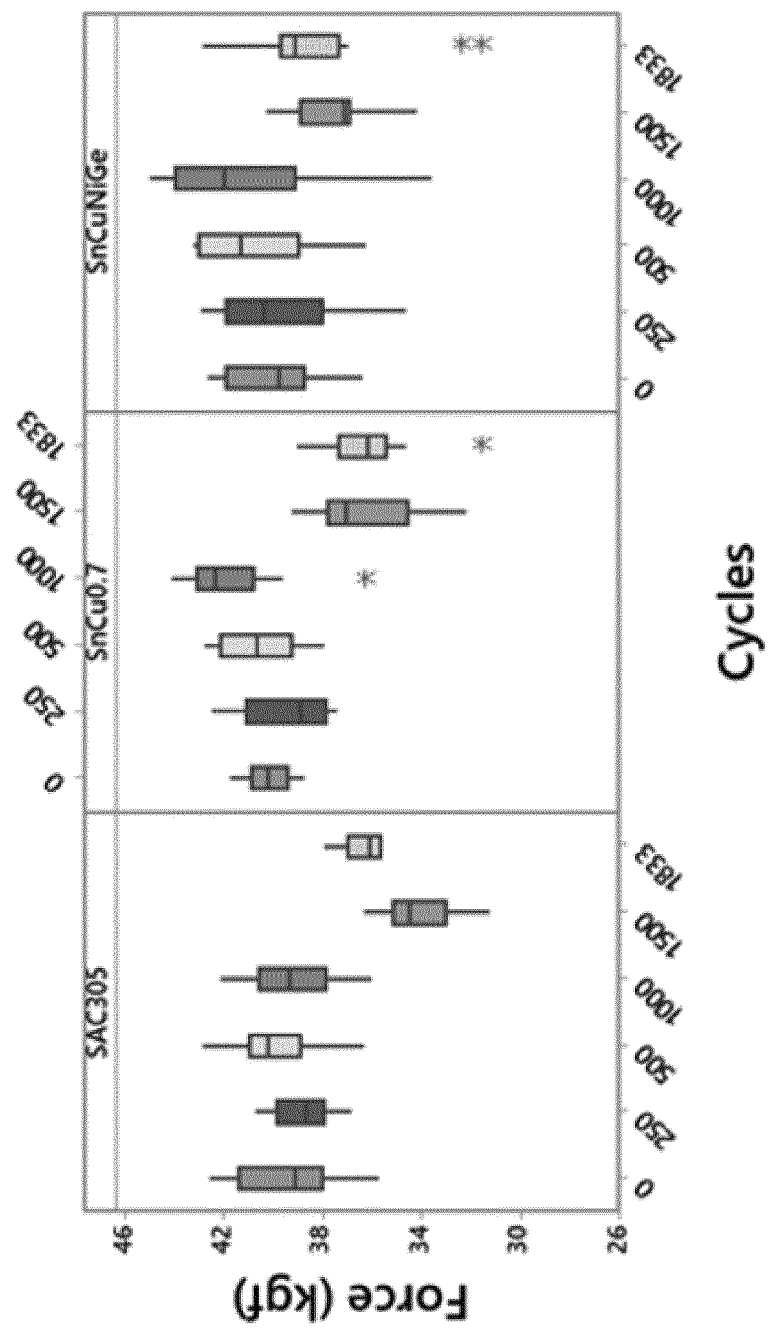
FIG. 6 shows a boxplot of shear force (kgf) vs cycles for conventional solder alloy SAC305 (left), conventional solder alloy SnCu0.7 (middle) and the solder alloy of Example 3 SnCuNiGe (right) on a FR4 board.
Figure 7:
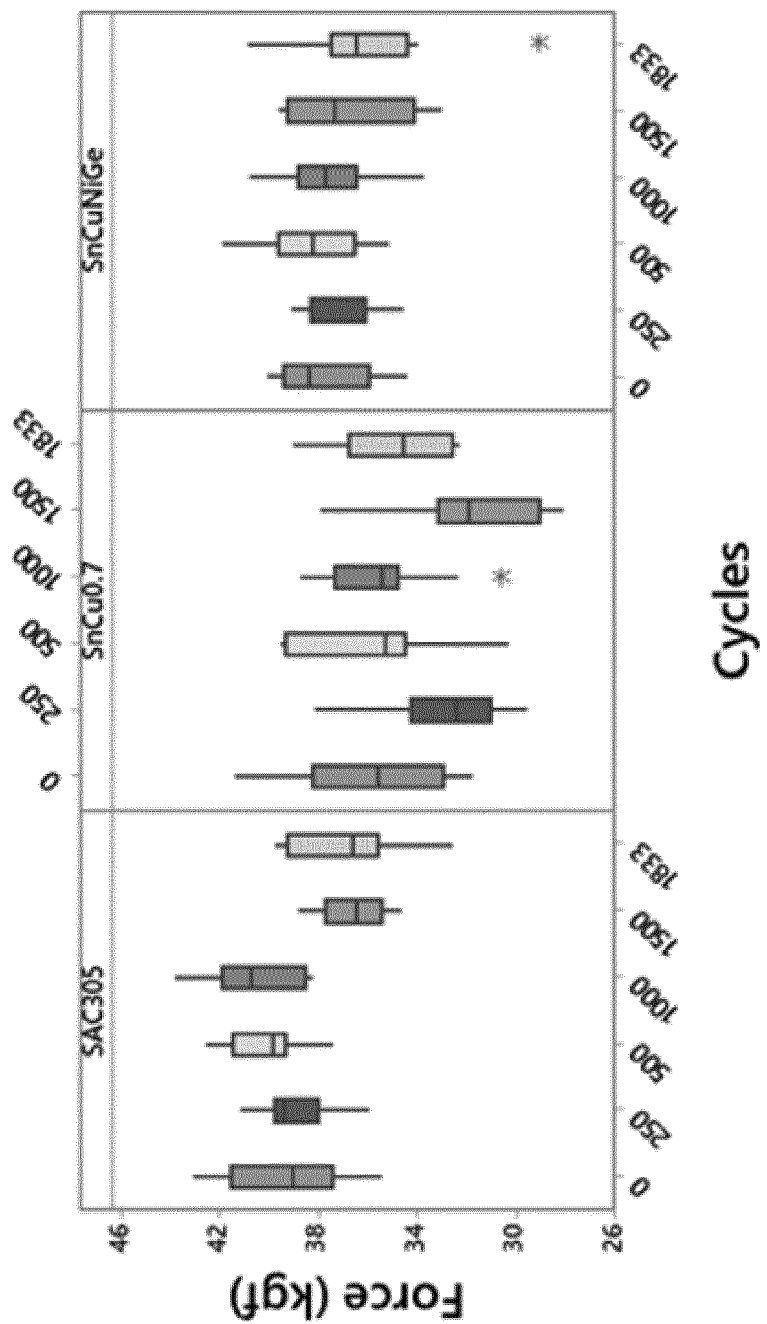
FIG. 7 shows a boxplot of Shear force (kgf) vs cycles for conventional solder alloy SAC305 (left), conventional solder alloy SnCu0.7 (middle) and the solder alloy of Example 3 SnCuNiGe (right) on a metal board.

An alloy having the following composition was prepared:
Cu: 2.5 wt. %
Ni: <0.05 wt. %
Ge: <0.005 wt. %
Balance: Sn, together with unavoidable impurities.
Die Tilt Analysis:
Die tilt analysis was carried out comparing the alloy with conventional SAC305 solder alloy. The results are shown in FIGS. 1 and 2. SnCuNiGe demonstrates minimal change in die tilt between $1^{st}$ reflow (circles) and $4^{th}$ reflow (triangles), whereas SAC305 shows considerable variation
Void Analysis:
Void analysis was carried out comparing the alloy with conventional SAC305 solder alloy. The results are shown in FIGS. 3, 4 and 5. As shown in FIGS. 3 and 4, contrary to SAC305, SnCuNiGe demonstrates minimal change in voids % between $1^{st}$ and $4^{th}$ reflow. FIG. 5 shows that with SnCuNiGe the change in voids percentage between $1^{st}$ and $4^{th}$ reflow is less significant than SAC305
Shear and Thermal Testing:
The following tests and conditions were employed:
Mid-power Lumileds 3535L LED chosen to directly compare optical, thermal and shear performance of the solder pastes
Identical Al-MCPCB and FR4-PCB boards designed for the chosen LED, having contact pads with an ENIG finish
Shear Tests: 1833 thermal cycles
As can be seen in FIGS. 6 and 7, SnCuNiGe showed the most stable shear strength values, with increasing thermal cycles, in both MCPCB and FR4 assemblies.
The foregoing detailed description has been provided by way of explanation and illustration, and is not intended to limit the scope of the appended claims. Many variations in the presently preferred embodiments illustrated herein will be apparent to one of ordinary skill in the art, and remain within the scope of the appended claims and their equivalents.

The invention claimed is:

1. A lead-free solder alloy consisting essentially of:
from 1 to 3.5 wt. % copper,
from 0.001 to 0.05 wt. % nickel,
from 0.0005 to 0.08 wt. % germanium,
the balance tin together with any unavoidable impurities.

2. The solder alloy of claim 1, consisting essentially of from 1.5 to 3.5 wt. % copper.

3. The solder alloy of claim 1, consisting essentially of from 0.005 to 0.02 wt. % nickel.

4. The solder alloy of claim 1, consisting essentially of from 0.0005 to 0.02 germanium.

5. The solder alloy of claim 1, consisting essentially of from 2 to 3 wt. % copper, from 0.005 to 0.02 wt. % nickel, from 0.001 to 0.005 wt. % germanium, and the balance tin together with any unavoidable impurities.

6. The solder alloy of claim 1 in the form of a bar, a rod, a solid wire with or without flux, a foil or strip, a film, a preform, or a powder or paste (powder plus flux blend), or solder spheres for use in ball grid array joints, or a pre-formed solder piece or a reflowed or solidified solder joint, or pre-applied on any solderable material such as a copper ribbon for photovoltaic applications.

7. A soldered joint comprising a solder alloy of claim 1.

8. A method of forming a solder joint comprising:
(i) providing two or more work pieces to be joined;
(ii) providing a solder alloy as defined in claim 1; and
(iii) heating the solder alloy in the vicinity of the work pieces to be joined.

9. Use of a solder alloy of claim 1 in a soldering method, wherein the soldering method is selected from Surface Mount Technology (SMT) soldering, die attach soldering, thermal interface soldering, hand soldering, laser and RF induction soldering, and rework soldering.

* * * * *